United States Patent [19]
Otto et al.

[11] 3,759,586
[45] Sept. 18, 1973

[54] ENDLESS TRACK PIN ASSEMBLY

[75] Inventors: Robert J. Otto, Grosse Pointe Woods; Alex H. Sinclair, Southfield, Mich.; Ralph K. Reynolds, Saratoga; Robert F. Neargarder, San Jose, both of Calif.

[73] Assignee: The United States of America as represented by the Secretary of the Army

[22] Filed: May 9, 1972

[21] Appl. No.: 251,845

Related U.S. Application Data

[62] Division of Ser. No. 17,276, March 6, 1970, Pat. No. 3,680,924.

[52] U.S. Cl. .................................... 305/11, 305/58
[51] Int. Cl. ............................................. B62 55/20
[58] Field of Search .................. 305/11, 14, 58, 59; 74/254

[56] References Cited
UNITED STATES PATENTS
3,504,951  4/1970  Hirych .................................. 305/58
3,620,578  11/1971  Fix ....................................... 305/58

Primary Examiner—Richard J. Johnson
Attorney—Harry M. Saragovitz et al.

[57] ABSTRACT

A track pin assembly for an endless track including a plurality of track shoes pivotably connected by hinges including tapered seals protecting a spherical bearing which is mounted on an adjustable diameter track pin. The track pin is rigidly connected to a portion of one track shoe and a portion of the bearing which is secured to the adjacent track shoe.

3 Claims, 3 Drawing Figures

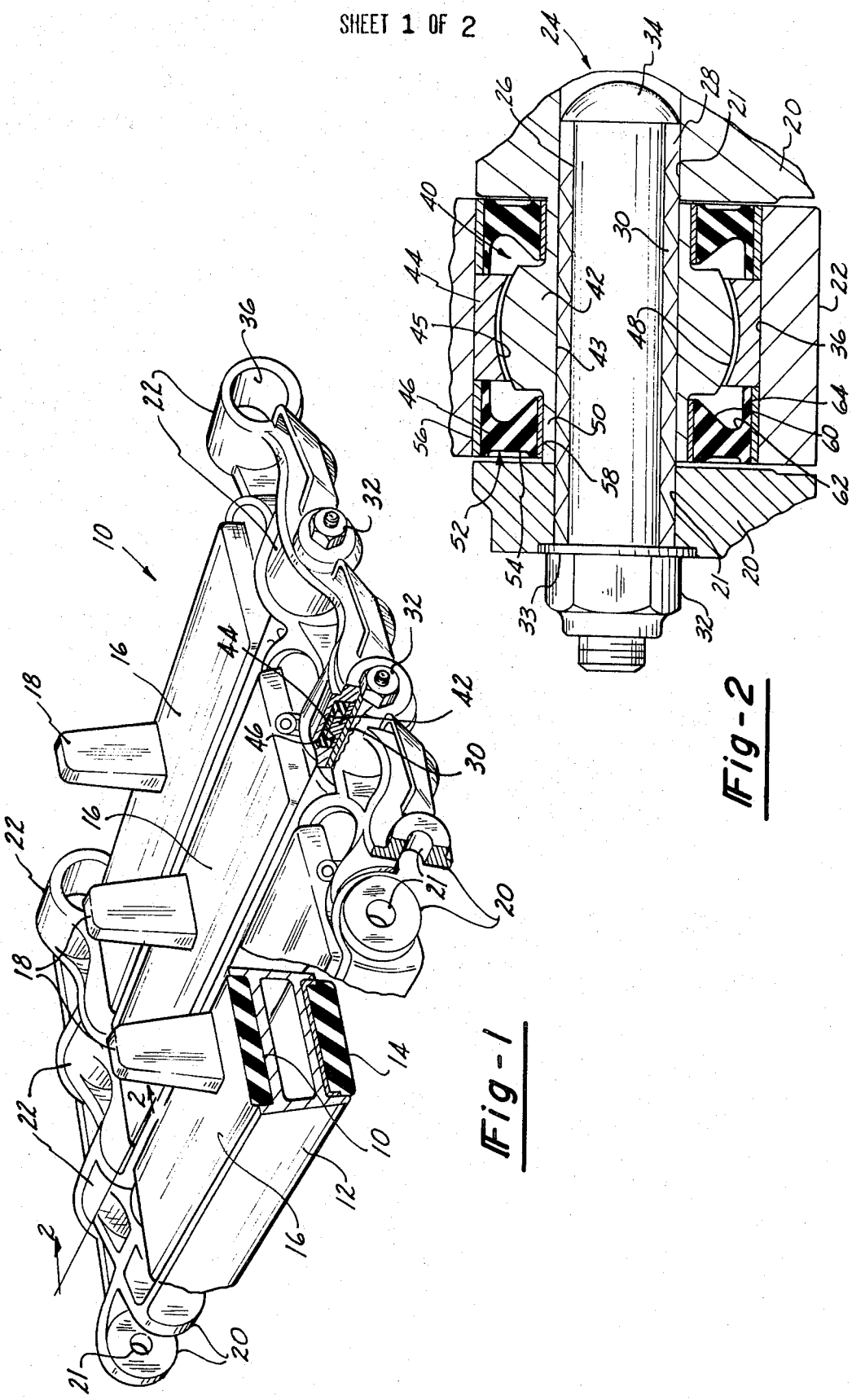

ENDLESS TRACK PIN ASSEMBLY

This is a division of application Ser. No. 17,276, filed Mar. 6, 1970, now U.S. Pat. No. 3,680,924, issued Aug. 1, 1972.

The invention described herein may be manufactured, used, and licensed by or for the Government for governmental purposes without payment to us of any royalty thereon.

This invention relates to an endless track and in particular this invention relates to the track pin assemblies connecting adjacent track shoes.

Many military and commercial vehicles encounter extremely adverse terrain in which endless tracks must be utilized to provide adequate traction. These tracks commonly include a plurality of track shoes pivotably connected in an endless belt about two or more sprockets on opposite sides of the vehicle. At least two of the sprockets are connected to a power source to provide the driving power for the track.

As would naturally be expected, track type vehicles are subjected to extreme loads and vibrations which are transmitted through the track to the track pin assemblies which connect adjacent track shoes. Such assemblies in prior art devices would rapidly deteriorate due to the uneven stress distribution throughout the bearing which was incorporated in the pin assembly. Moreover, the construction of such prior assemblies did not lend themselves to proper sealing techniques and as a result the deterioration of the bearings would be further accelerated by dust and dirt which abrade the bearing surfaces. Another disadvantage of prior art pin assemblies is the lack of a proper connection between the track pin and the track shoe to which it is to be secured. This results in slippage and resultant wear which forces replacement of the pin assembly. Moreover, the replacement of the worn track pins requires disassembly of the bearing which is cumbersome, hazardous, and time consuming.

According to the present invention, there is provided an endless track having a plurality of articulately connected track shoes. Each track shoe is connected to the adjacent shoe by a pair of track pin assemblies including an adjustable diameter track pin, a spherical bearing, and a seal. The spherical bearing is operatively positioned between adjacent track shoes with a portion rigidly connected with a collar which is attached to one shoe and another portion rigidly connected with the adjustable diameter track pin. The pin is rigidly secured to the adjacent track shoe. A tapered seal is provided intermediate a portion of the bearing and a portion of one of the track shoes.

Other advantages of the present invention will become apparent to one having ordinary skill in the art when considered in connection with the following description and accompanying drawings of which:

FIG. 1 is a perspective view of a portion of an endless track partly broken away and in section according to the invention;

FIG. 2 is a cross sectional view of the track pin assembly taken along line 2—2 of FIG. 1.

Figure 3:
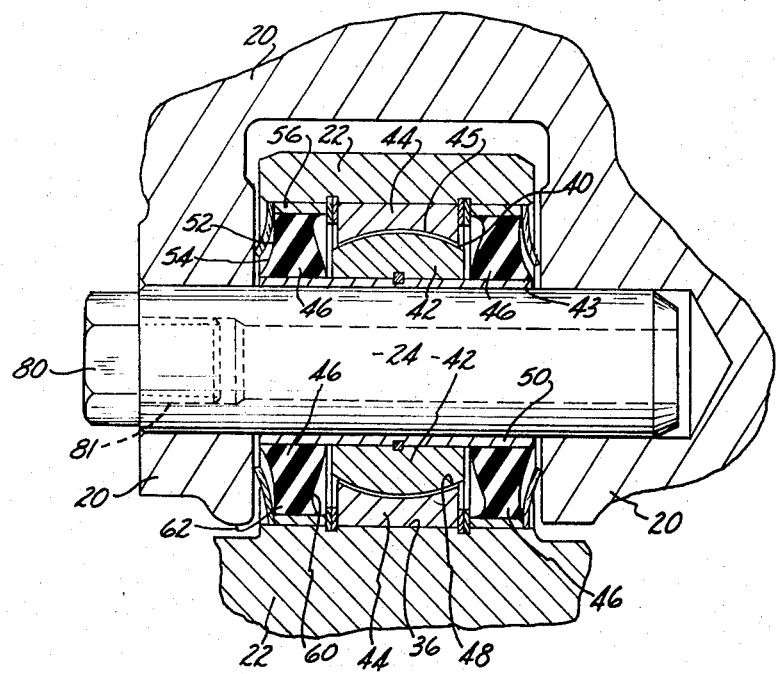
FIG. 3 is a cross sectional view of an alternate form of the invention.

Referring now to the drawing wherein similar numerals will refer to similar parts in the various figures, a portion of an endless track is shown. The track includes a plurality of articulately connected track shoes, generally shown at 10. Each track shoe includes a yoke 12 engaging removable pad 14 and road wheel pad 16. The pads are bonded or otherwise suitably secured to yoke 12 which includes a center guide portion 18 guiding the track relative to the sprocket and road wheels. Road wheels, not shown, form part of the suspension system and engage road wheel pad 16.

At each lateral edge of the yoke 12 are secured a pair of spaced apart collars 20 along the forward longitudinal edge of the yoke. Located on the opposite longitudinal extremities of the yoke 12 is a single collar 22 located at each of the opposite lateral edges of each yoke. As shown in the drawings, the single collar 22 of each shoe is positioned intermediate the pair of spaced apart collars 20 of the adjacent shoe.

Each of the track shoes is permitted to oscillate relative to an adjacent track shoe by a pair of track pin assemblies, FIGS. 2 and 3, which are shown partially in section in FIG. 1 and in more detail in FIGS. 2 and 3. A track pin shown generally at 24 is rigidly connected to each pair of spaced apart collars 20 and consists of an inner bolt 26, adjustable wall thickness bushings 28, washers 30, and self locking nut 32. By tightening nut 32 against lock washer 33, a compressive force is applied to the bushings and washers located between nut 32 and head 34. This force causes the adjustable wall thickness bushings 28 to assume a larger diameter against bore 21 of collar 20 and simultaneously washer 33 is forced against the inner bolt 26 thereby providing an extremely tight radial fit between the adjustable diameter pin 24 and the spaced apart collars 20.

As is best seen in FIG. 2, head 34 lies wholly within bore 21 of collar 20, while washer 33 and nut 32 lie wholly outside bore 21. Bolt 26 is thus positioned and axially located in bore 21 by washer 33. As is evident from observation of FIG. 1, the nuts 32 are disposed at the edges of the track assembly where they can be reached by maintenance personnel, whereas heads 34 are inaccessible.

A spherical bearing shown generally at 40 is operatively positioned between each of the track pins 26 and the bore 36 of the single collar 22 which is positioned between each pair of collars 20. Each spherical bearing 40 includes an inner race 42, an outer race 44, whose spherical surface may be coated or bonded with a substance, such as "Teflon," or other suitable materials, and a seal 46. Inner race 42 includes a cylindrical bore 43 therethrough in which adjustable diameter pin 24 is rigidly secured. When nut 32 is tightened, the inner action of the bushings 28 and washers 30 operates to remove all clearance between the bore 43 of pin 24 and the inner race 42, hence eliminating backlash and assuring proper bearing rotation. Race 42 is thus not permitted to rotate relative to the track pin 24.

Inner race 42 also includes an outer convex bearing surface 48 and a circumferential flange 50 extending axially on opposite sides of race 42. The outer surface 48 is spherically shaped to provide uniform loading in case of misalignment of track pin 24 due to machine errors or deflection of track shoes 10. In FIG. 2 axially extending flanges 50 are integrally formed with race 42 and are secured to pin 24 by a no clearance fit. The flanges 50 provide a base for seal 46 so that the bearings remain sealed against dirt even though the track pins 24 are removed.

Outer race 44 is concentrically located with respect to inner race 42 and is rigidly secured to single collar 22 by a force fit or any other suitable securing means.

The inner surface 45 of outer race 44 is concave and complementary with the outer spherical bearing surface of inner race 42. In addition to absorbing radial loads, bearing surfaces 48 and 45 coact to absorb axial or thrust loads, thus eliminating the need of an additional thrust bearing. Surfaces 48 and 45 are free to rotate relative to each other while still maintaining uniform loading throughout. As shown in the drawing, the width of inner bearing surface 48 is slightly wider than the bearing surface 45.

A seal 52 is shown mounted on either side of each spherical bearing 40 and includes an elastomeric ring 54 bonded to first and second metal rings 56 and 58 (or 50 in FIG. 3). To eliminate inadequate performance due to slippage between the seal and the contacting metal parts, the elastomeric ring 54, which can be made of rubber or any other suitable substance, is bonded to metal rings 56 and 58 (or 50 in FIG. 3) on both the inside and outside diameters. Rings 56 and 58 are then pressed or cemented into the housing and over the inner race circumferential flanges 50. Thus, when collar 22 rotates relative to collars 20, ring 56 will remain fixed to collar 22, while ring 58 (or 50 in FIG. 3) will rotate with inner race 42 and collar 20. Ring 54 will be forced to flex by the torsional stress set up by relative movement of inner and outer rings 56 and 58, (or 50 in FIG. 3).

Particular attention is directed to the shape of seal 52 which is specifcally designed to eliminate excessive shear stresses which lead to torsional fatigue failure as shown at 60, the pre-compressed elastomeric ring 54 is tapered such that the axial thickness becomes increasingly smaller with an increasingly radially outward distance from the inner ring 58 or (50 in FIG. 3). This taper continues for a substantial portion of the radial thickness of the elastomeric ring until the minimum axial thickness is reached at 62. To improve the bonding between the elastomeric ring 52 in the outer ring 56, a tubular extension 64, at the outer radial extremity of seal ring 46 is provided. The taper is such that the circumferential areas formed by concentric cylinders intersecting ring 52 remain substantially constant for a substantial portion of the distance between inner and outer rings 58 (or 50 in FIG. 3) and 56. For example, the area formed by the elastomeric ring intersecting a coaxial cylinder which is adjacent to inner ring 58 or 50 (in FIG. 3) has a wide axial width; however, the diameter of the intersecting cylinder will be relatively small. On the other hand, the width of the intersecting cylinder taken through point 62 will be relatively small, but, the diameter will be relatively large, whereby the areas of intersection in the two cases will be substantially equal.

As the track negotiates the sprocket or engages uneven terrain, adjacent track shoes will oscillate relative to each other. This will cause elastomeric member 52 to be subjected to torsional shear stress; however, the inner and outer rings 56, 58, (or 50 in FIG. 3) will not move relative to the adjacent surfaces of member 52 therefore the bearing seal will not abrade and deteriorate. This will cause track pins 24 to be inclined to the horizontal as shown in the drawing. With the spherical bearings employed, the inner race 42 will rotate slightly relative to outer race 44 and uniform distribution of the load will take place. The track pin 24, of course, remains rigidly secured to the inner race 42 of spherical bearing 40 and collars 20 thus eliminating back-lash and assuring proper bearing rotation.

In FIG. 3 there is disclosed an alternative embodiment of our invention, the same being quite similar to the structure shown in FIG. 2, with the following exceptions: inner race circumferential flanges 50, FIG. 2, and inner ring 58 are replaced by a single part, namely a sleeve, 50 in FIG. 3. FIG. 3 also differs from FIG. 2 in that the track pin 24, in FIG. 3, does not utilize an inner bolt 26, an adjustable wall thickness bushing 28, washer 30 and self-locking nut 32. However a bolt 80 fills threaded hole 81 into which a threaded pulling tool (not shown) can be screwed into part 24 to remove the pin.

Track pin 24, FIG. 3, is smooth and cylindrical and is retained in bore 21 and the internal surface 43 of sleeve 50, by means of either a press fit or retaining compound or a combination. The elastomeric ring 54 is bonded directly to the inner race circumferential flange 50. Other components of FIGS. 2 and 3 are substantially the same.

Inner race circumferential flange 50 is firmly bonded or press fitted to inner race 42.

We wish it to be understood that we do not desire to be limited to the exact details of construction shown and described, for obvious modifications will occur to a person skilled in the art.

We claim:

1. An endless track including a plurality of articulately connected track shoes, each of said track shoes connected to an adjacent track shoe by pairs of track pin assemblies:
   a. each of said track shoes comprising a yoke including
      i. a pair of spaced-apart collars located at opposite lateral edges along one longitudinal extremity of said yoke,
      ii. a single collar located at opposite lateral edges along the other longitudinal extremity of said yoke, and
      iii. a guide portion for guiding the track, each single collar of each shoe being located between a pair of spaced-apart collars on the adjacent shoe;
   b. each of said track pin assemblies including
      i. a pin rigidly connected with each of said pairs of collars,
      ii. a sleeve secured on each pin non-rotatable relative to its pin and coextensive with the spacing between the two collars of its associated pair,
      iii. a spherical bearing operatively positioned between the collars of each of said pairs, including
         1. an inner race secured to the sleeve and non-rotatable relative to the sleeve and having an external convex bearing surface,
         2. an outer race concentric with said inner race, being rigidly connected to said single collar and having a concave internal bearing surface complimentary with said convex bearing surface, and
         3. a seal mounted on each side of said spherical bearing, each such seal including a sleeve secured to said single collar and an elastomeric ring bonded to said seal sleeve and the sleeve secured on the pin.

2. In a track as in claim 1, wherein said collars are bored and each said pin has one end concealed from view in one of the collars of its associated pair and its other end terminating at the end of the bore of the remaining one of the collars of said pair.

3. A track as in claim 2, said other end of the pin being bored and threaded to receive a pin extracting tool.

* * * * *